(12) United States Patent
Singh et al.

(10) Patent No.: US 10,764,348 B2
(45) Date of Patent: Sep. 1, 2020

(54) METHODS AND SYSTEMS FOR IMPROVING QUALITY OF DIGITAL COMMUNICATION IN COMMUNICATION SESSIONS

(71) Applicant: CALLSTATS I/O Oy, Helsinki (FI)

(72) Inventors: Varun Singh, Helsinki (FI); Jörg Ott, Munich (DE)

(73) Assignee: 8x8, Inc., Campbell, CA (US)

( * ) Notice: Subject to any disclaimer, the term of this patent is extended or adjusted under 35 U.S.C. 154(b) by 120 days.

(21) Appl. No.: 15/706,813

(22) Filed: Sep. 18, 2017

(65) Prior Publication Data

US 2019/0089762 A1    Mar. 21, 2019

(51) Int. Cl.
*H04L 29/06* (2006.01)
*H04L 12/26* (2006.01)
*H04W 72/12* (2009.01)
*G06F 16/00* (2019.01)

(52) U.S. Cl.
CPC ............ *H04L 65/608* (2013.01); *H04L 43/04* (2013.01); *H04L 43/08* (2013.01);
(Continued)

(58) Field of Classification Search
CPC ... H04L 65/608; H04L 65/4069; H04L 43/04; H04L 43/08; H04L 65/1086;
(Continued)

(56) References Cited

U.S. PATENT DOCUMENTS

2008/0101338 A1   5/2008 Reynolds et al.
2009/0138579 A1*  5/2009 Jung ................... H04L 41/0253
                                                       709/221
(Continued)

FOREIGN PATENT DOCUMENTS

WO    2012/159210 A1    11/2012

OTHER PUBLICATIONS

International Search Report and Written Opinion of the International Search Authority received for International Application No. PCT/FI2018/050622, dated Dec. 13, 2018, 16 pages.
(Continued)

*Primary Examiner* — Arvin Eskandarnia
*Assistant Examiner* — Chhian (Amy) Ling
(74) *Attorney, Agent, or Firm* — Crawford Maunu PLLC

(57) ABSTRACT

A method of improving quality of digital communication in a communication session between communicating entities includes collecting context information pertaining to at least one of the communicating entities. The context information is indicative of a plurality of context parameters related to at least one of: a device, a communication client, at least one media stream, an access network. Information indicative of a plurality of performance-specific observations recorded at one or more monitoring entities is collected. The observations are analyzed to determine the quality of digital communication in the communication session. The context information is analyzed, to identify at least one action to be taken to improve the quality of digital communication. Information indicative of the at least one action is sent to the at least one of the communicating entities and/or the at least one network entity during the communication session.

20 Claims, 7 Drawing Sheets

(52) U.S. Cl.
CPC ........ *H04L 65/1086* (2013.01); *H04L 65/403* (2013.01); *H04L 65/4069* (2013.01); *H04L 65/80* (2013.01); *H04W 72/1231* (2013.01); *G06F 16/00* (2019.01)

(58) Field of Classification Search
CPC .. H04L 65/403; H04L 65/80; H04W 72/1231; G06F 17/30; G06F 16/00
See application file for complete search history.

(56) References Cited

U.S. PATENT DOCUMENTS

| | | | |
|---|---|---|---|
| 2011/0246541 A1* | 10/2011 | Sakai | H04L 43/0817 707/812 |
| 2012/0300646 A1* | 11/2012 | Sloyer | H04L 12/1827 370/252 |
| 2013/0041988 A1* | 2/2013 | Rodermund | H04L 41/0806 709/220 |
| 2015/0016285 A1 | 1/2015 | Yuan et al. | |
| 2017/0237851 A1 | 8/2017 | Hassan et al. | |
| 2019/0296853 A1* | 9/2019 | Henry | H02J 13/002 13/2 |

OTHER PUBLICATIONS

EPO. International Preliminary Report on Patentability of the International Search Authority for counterpart International Application No. PCT/FI2018/050622, dated Jan. 3, 2020, 9 pages.

* cited by examiner

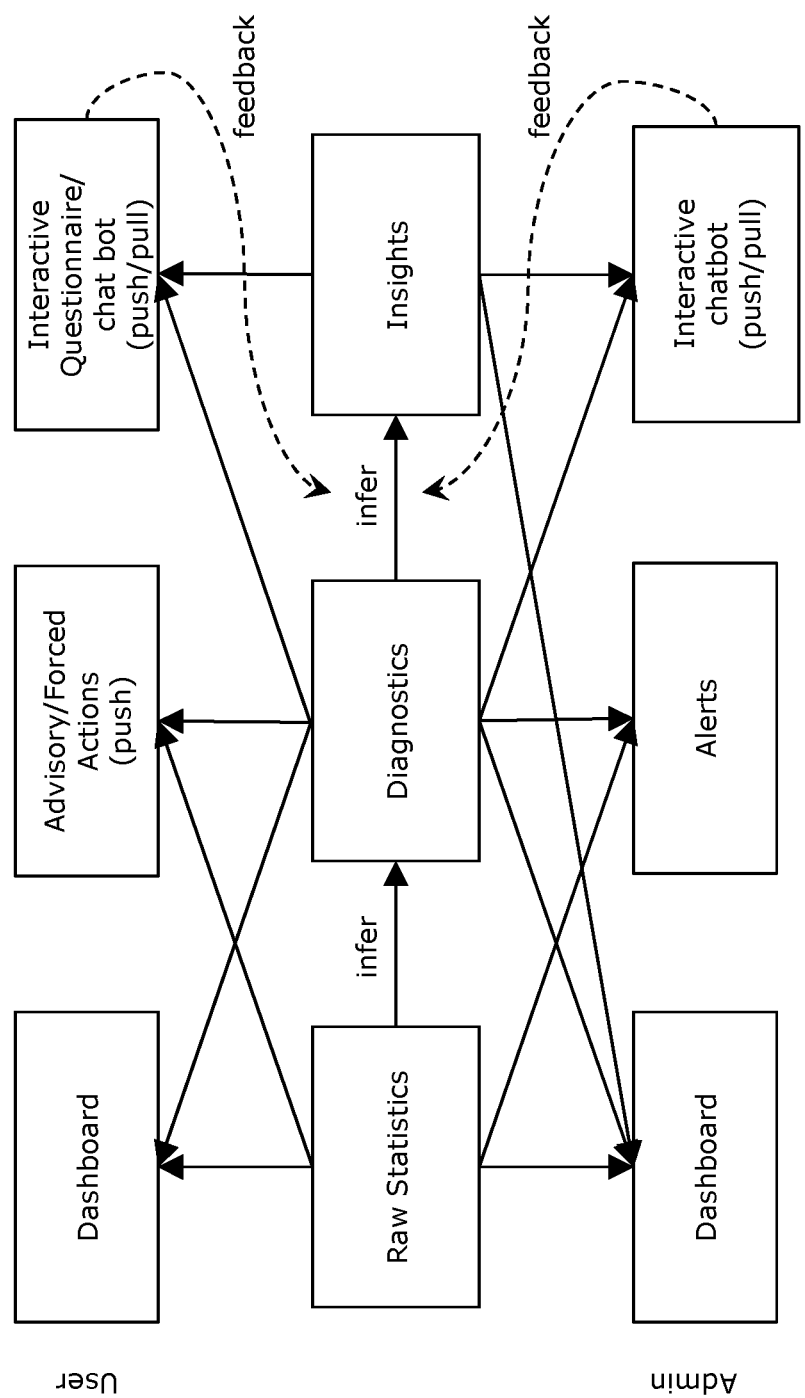

METHODS AND SYSTEMS FOR IMPROVING QUALITY OF DIGITAL COMMUNICATION IN COMMUNICATION SESSIONS

TECHNICAL FIELD

The present disclosure relates to methods of improving quality of digital communication in a communication session between at least two communicating entities. Moreover, the present disclosure relates to systems for improving quality of digital communication in a communication session between at least two communicating entities. Furthermore, the present disclosure also concerns computer program products comprising non-transitory machine-readable data storage media having stored thereon program instructions that, when accessed by processing devices, cause the processing devices to perform the aforementioned methods.

BACKGROUND

With rapid advancements in communication technologies, an ever-increasing number of people are getting connected to each other via data communication networks (for example, such as the Internet). Consequently, nowadays, a wide variety of communication services (for example, such as file transfer services, streaming media services, conferencing services, and the like) are being provided over such data communication networks.

Moreover, the existing communication services are capable of supporting diverse media types and establishing a communication between multiple communicating entities for various durations. As an example, nowadays, there exist audio-video conferencing services that allow one-to-one, one-to-many, many-to-one, and many-to-many communication between communicating entities.

Furthermore, the number of communication services that are being provided via the data communication networks is increasing by the day. However, with such an increase in the number of highly advanced communication services, demands pertaining to capacity, performance, reliability and flexibility of the data communication networks are also increasing.

Presently, the quality of communication over the data communication networks is known to fluctuate often, due to factors such as multiple communication services being active concurrently, changes in network load, changes in network topology, user mobility, physical properties of communication channel, and so forth. Conventionally, Communication Service Providers (CSP's), for example, such as Netflix® video distribution service, may test the "quality of the line" to select suitable bitrate/codec and other parameters.

However, the existing techniques are severely limited in their ability to provide a generic framework for adapting to unpredictable and dynamically changing data communication network environments. As a result, the quality of the communication between the communicating entities is often sub-optimal.

Moreover, participants involved in a conference often partake in unnecessary communication, as they do not know whether or not other participants in the conference are able to hear or see them. This leads to unnecessary and avoidable communication between the participants, for example, such as "I lost last minute of the discussion", "do you hear me, yes no?", and so on.

Therefore, in light of the foregoing discussion, there exists a need to overcome the aforementioned drawbacks associated with conventional communication services.

SUMMARY

The present disclosure seeks to provide a method of improving quality of digital communication in a communication session between at least two communicating entities. The present disclosure also seeks to provide a system for improving quality of digital communication in a communication session between at least two communicating entities. A further aim of the present disclosure is to at least partially overcome at least some of the problems of the prior art, as discussed above.

In a first aspect, embodiments of the present disclosure provide a method of improving quality of digital communication in a communication session between at least two communicating entities, the method comprising:

(a) collecting, from at least one of the at least two communicating entities, context information pertaining to the at least one of the at least two communicating entities, wherein the context information is indicative of a plurality of context parameters related to at least one of:
  (i) a device associated with the at least one of the at least two communicating entities,
  (ii) a communication client being employed for the communication session by the at least one of the at least two communicating entities,
  (iii) at least one media stream being communicated between the at least two communicating entities during the communication session, (iv) an access network being employed for the communication session by the at least one of the at least two communicating entities;

(b) collecting, from at least one monitoring entity, information indicative of a plurality of performance-specific observations recorded at the at least one monitoring entity, wherein the plurality of performance-specific observations pertain to at least one of: the at least one media stream, packets of the at least one media stream, the device associated with the at least one of the at least two communicating entities, wherein the at least one monitoring entity comprises at least one of: the at least one of the at least two communicating entities, at least one network entity forwarding the at least one media stream between the at least two communicating entities;

(c) analyzing the plurality of performance-specific observations to determine the quality of digital communication in the communication session;

(d) analyzing the context information, whilst taking into account the determined quality, to identify at least one action to be taken to improve the quality of digital communication; and (e) sending, to the at least one of the at least two communicating entities and/or the at least one network entity, information indicative of the at least one action to be taken, wherein the information indicative of the at least one action is sent during the communication session.

In a second aspect, embodiments of the present disclosure provide a system for improving quality of digital communication in a communication session between at least two communicating entities, the system comprising a server arrangement that is configured to:

(a) collect, from at least one of the at least two communicating entities, context information pertaining to the at least one of the at least two communicating entities, wherein the context information is indicative of a plurality of context parameters related to at least one of:
  (i) a device associated with the at least one of the at least two communicating entities,
  (ii) a communication client being employed for the communication session by the at least one of the at least two communicating entities,
  (iii) at least one media stream being communicated between the at least two communicating entities during the communication session,
  (iv) an access network being employed for the communication session by the at least one of the at least two communicating entities;
(b) collect, from at least one monitoring entity, information indicative of a plurality of performance-specific observations recorded at the at least one monitoring entity, wherein the plurality of performance-specific observations pertain to at least one of: the at least one media stream, packets of the at least one media stream, the device associated with the at least one of the at least two communicating entities, wherein the at least one monitoring entity comprises at least one of: the at least one of the at least two communicating entities, at least one network entity forwarding the at least one media stream between the at least two communicating entities;
(c) analyze the plurality of performance-specific observations to determine the quality of digital communication in the communication session;
(d) analyze the context information, whilst taking into account the determined quality, to identify at least one action to be taken to improve the quality of digital communication; and
(e) send, to the at least one of the at least two communicating entities and/or the at least one network entity, information indicative of the at least one action to be taken, wherein the information indicative of the at least one action is to be sent during the communication session.

In a third aspect, embodiments of the present disclosure provide a computer program product comprising a non-transitory machine-readable data storage medium having stored thereon program instructions that, when accessed by a processing device, cause the processing device to:
(a) collect context information pertaining to a communicating entity associated with the processing device during a communication session, wherein the context information is indicative of a plurality of context parameters related to at least one of:
  (i) the processing device,
  (ii) a communication client being employed for the communication session by the communicating entity,
  (iii) at least one media stream being communicated between the communicating entity and at least one other communicating entity during the communication session,
  (iv) an access network being employed for the communication session by the communicating entity;
(b) record a plurality of performance-specific observations pertaining to at least one of: the at least one media stream, packets of the at least one media stream, the processing device;
(c) analyze the plurality of performance-specific observations to determine quality of digital communication in the communication session;
(d) analyze the context information, whilst taking into account the determined quality, to identify at least one action to be taken to improve the quality of digital communication, wherein the at least one action is to be taken during the communication session.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 7 is a schematic illustration of how raw statistics, diagnostics and insights are provisioned, in accordance with an embodiment of the present disclosure.

Figure 1:
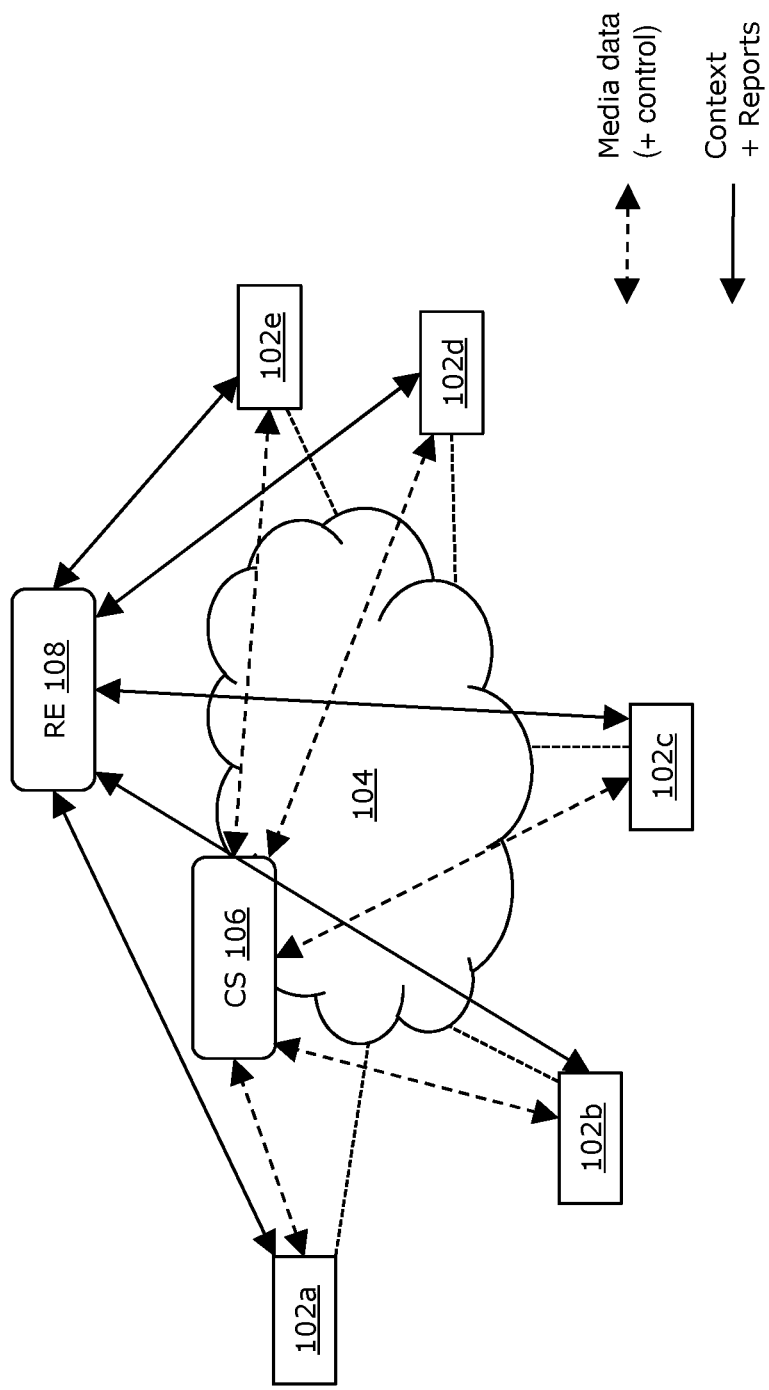
FIG. 1 is a schematic illustration of a network environment, wherein a system for improving quality of digital communication in a communication session between communicating entities is implemented pursuant to embodiments of the present disclosure.

In the accompanying drawings, an underlined number is employed to represent an item over which the underlined number is positioned or an item to which the underlined number is adjacent.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Glossary

Brief definitions of terms used throughout the present disclosure are given below.

The terms "call" or "conference" generally refer to an interaction between two or more user entities over a data communication network in which the user entities exchange information of at least one medium (modality). Throughout the present disclosure, the terms "call" and "conference" have been used interchangeably.

The term "medium" generally refers to any one of:

a digital representation of audio or speech data or audible noise, a digital representation of video or sequences of still image data, a digital representation of written text, still image, drawings, or other information, a digital representation of measured instantaneous physical properties, for example including, but not limited to, brightness, temperature, velocity, acceleration, position, direction, presence or composition of chemical substances (for example, such as air, water and so forth), a digital representation of computer-generated properties (for example, such as virtual environments) as, for example, in games or simulations, or a digital representation of instructions to be carried out in a physical or a virtual or a composite environment.

Notably, media may comprise discrete or continuous contents, or a combination of both. Media content is optionally transmitted as one or more data units encapsulated in Internet Protocol (IP) packets (namely, IPv4 and IPv6). Those skilled in the art will appreciate that other communication protocols, including, but not limited to, cellular networks, information-centric networks, may be used to carry such data units.

Throughout the present disclosure, the term "videos" encompasses two-dimensional (2D) videos as well as three-dimensional (3D) videos, while the term "images" encompasses both 2D images and 3D images.

The term "media stream" generally refers to a flow of packets that represent media content. A media stream comprises a plurality of packets being transmitted via a data communication network, wherein the plurality of packets share one or more common properties (for example, such as source and destination addresses or port numbers).

The term "communication session" generally refers to a communication session in which participating entities communicate media streams therebetween.

The term "packet" generally refers to a data packet that is communicated from a given transmitting entity to a given receiving entity. The term "packet" encompasses both media packets as well as non-media packets.

A media packet comprises media of at least one type. Optionally, a media packet comprises at least one of: audio data, video data, image data. Audio, video, and other types of media may be conveyed within a same media packet, or may be spread across different media packets.

On the other hand, a non-media packet is a control packet that is optionally exchanged between two communicating entities as a part of a media stream. Zero, one, or more non-media packets are exchanged between the two communicating entities, possibly in each direction. Such non-media packets are optionally used to determine whether or not the two communicating entities can communicate with each other via a given data communication network. It is to be noted here that non-media packets can be exchanged at the beginning of a communication session as well as during the communication session, namely can precede as well as be interspersed with media packets.

The term "context" generally refers to a uniquely identifiable scenario of a given communicating entity or a group of communicating entities participating in a call.

The term "configuration" generally refers to a set of parameters that are used as settings for a call.

The term "user entity" generally refers to a functional entity (for example, such as an executed software program) operating on behalf of and interacting with a local (namely, co-located) user to allow the user to establish media communication with at least one other entity. An example of a user entity is a web browser running on a user device and executing program instructions of a multimedia (namely, audio/video) communication endpoint. Another example of a user entity is a dedicated application or "App" running on a user device and executing program instructions of a multimedia communication endpoint.

The term "communicating entity" generally refers to an entity that sources and/or sinks one or more media streams. A communicating entity could be a user entity that is communicating with another entity.

The term "network entity" generally refers to a functional entity that neither sources nor sinks media streams, but forwards media streams. Such forwarding may include address translation.

The term "monitoring entity" generally refers to an entity that records performance-specific observations pertaining to media streams. A monitoring entity is typically a logical function that may be implemented in hardware, software, firmware or a combination thereof, and that may be co-located with any one of: a communicating entity or a network entity. A monitoring entity may record performance-specific observations independently or in cooperation with functions of its co-located entity. The monitoring entity may also store data of the performance-specific observations recorded thereat.

The term "reporting entity" generally refers to an entity that collects data of performance-specific observations from other entities (namely, monitoring entities or other reporting entities) in a hierarchical manner. A reporting entity may process and/or store the collected data. The reporting entity may forward the collected data or the processed data or the stored data to another reporting entity or a recommendation entity. Optionally, a reporting entity is implemented by way of a separate server.

The term "recommendation entity" generally refers to an entity whose main task is to recommend advisory actions to endpoints/users and/or forced actions to communicating entities or network entities, based upon context information and observation information collected from communicating entities and monitoring entities, respectively. Optionally, the recommendation entity that controls other entities (for example, tells monitoring entities which calls to monitor, with what kind of parameters, and so on).

The term "marker" generally refers to a parameter whose value increases in a monotonic manner. Optionally, a marker is a packet sequence number or a representation of an offset within a given media stream that is assigned by a transmitting entity to each packet originating therefrom, wherein such packet sequence numbers or such representations of offsets are assigned in a monotonically-increasing manner. Alternatively, optionally, a marker is a time stamp that is assigned by a transmitting entity to each packet originating therefrom; the time stamp is not related to an absolute device clock associated with the transmitting entity, but is media-related. Such media-related time stamps are not required to be strictly monotonically increasing, but are monotonically increasing only within a time period that is substantially longer than a round trip delay between the transmitting entity and a given receiving entity.

The term "marker-line" is analogous to the term "time-line". On a marker-line, markers are arranged in an ascending order of their values. Optionally, when packet sequence numbers are used as markers, the marker-line is a series of packet sequence numbers assigned by a given transmitting entity. Likewise, optionally, when media-related time stamps are used as markers, the marker-line is a series of media-related time stamps assigned by a given transmitting entity.

The term "server" generally refers to an application, program, process or device in a client/server relationship that responds to requests for information or services by another application, program, process or device (namely, a client) on a communication network. The term "server" also encompasses software that makes the act of serving information or providing services possible.

The term "client" generally refers to an application, program, process or device in a client/server relationship that requests information or services from another application, program, process or device (namely, a server) on a communication network. Importantly, the terms "client" and "server" are relative, as an application may be a client to one application but a server to another application. The term "client" also encompasses software that makes the connection between a requesting application, program, process or device and a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

Embodiments of the Present Disclosure

In a first aspect, embodiments of the present disclosure provide a method of improving quality of digital communication in a communication session between at least two communicating entities, the method comprising:
(a) collecting, from at least one of the at least two communicating entities, context information pertaining to the at least one of the at least two communicating entities, wherein the context information is indicative of a plurality of context parameters related to at least one of:
  (i) a device associated with the at least one of the at least two communicating entities,
  (ii) a communication client being employed for the communication session by the at least one of the at least two communicating entities,
  (iii) at least one media stream being communicated between the at least two communicating entities during the communication session, (iv) an access network being employed for the communication session by the at least one of the at least two communicating entities;
(b) collecting, from at least one monitoring entity, information indicative of a plurality of performance-specific observations recorded at the at least one monitoring entity, wherein the plurality of performance-specific observations pertain to at least one of: the at least one media stream, packets of the at least one media stream, the device associated with the at least one of the at least two communicating entities, wherein the at least one monitoring entity comprises at least one of: the at least one of the at least two communicating entities, at least one network entity forwarding the at least one media stream between the at least two communicating entities;
(c) analyzing the plurality of performance-specific observations to determine the quality of digital communication in the communication session;
(d) analyzing the context information, whilst taking into account the determined quality, to identify at least one action to be taken to improve the quality of digital communication; and
(e) sending, to the at least one of the at least two communicating entities and/or the at least one network entity, information indicative of the at least one action to be taken, wherein the information indicative of the at least one action is sent during the communication session.

In a second aspect, embodiments of the present disclosure provide a system for improving quality of digital communication in a communication session between at least two communicating entities, the system comprising a server arrangement that is configured to perform the steps (a) to (e) of the aforementioned method.

The aforementioned method and the aforementioned system are capable of improving the quality of digital communication during the communication session, namely by enabling corrective actions to be taken whilst the communication session is still on-going. In other words, the method and the system enable corrective actions to be taken in real-time or near real-time.

The server arrangement is coupled in communication with the at least two communicating entities and the at least one monitoring entity via a data communication network. Moreover, the at least two communicating entities are communicably coupled with each other via the data communication network.

The data communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, community networks, satellite networks, vehicular networks, sensor networks, and Worldwide Interoperability for Microwave Access (WiMAX) networks. Such networks may run the Internet Protocol (IP), an information-centric protocol, or other protocols to achieve a desired data communication.

Examples of devices associated with the at least two communicating entities include, but are not limited to, mobile phones, smart telephones, smart watches, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, and large-sized touch screens with embedded PCs. Some specific examples of such devices include, but are not limited to, iPhone®, iPad®, Android® phone, Android® web pad, Windows® phone, and Windows® web pad.

In some implementations, the at least two communicating entities comprise a plurality of transmitting entities and a plurality of receiving entities. As an example, in a video conferencing session, the at least two communicating entities could comprise a group of user entities that may act as both transmitting entities as well as receiving entities.

Moreover, optionally, the at least one action concerns a configuration that is recommended to be used at the at least one of the at least two communicating entities and/or a configuration that is recommended to be used at the at least one network entity. It will be appreciated that such a configuration is determined based upon the plurality of context parameters, namely to suit the plurality of context parameters.

Additionally, optionally, the configuration is determined based upon past trends identified for other communicating entities that were involved in other communication sessions and that had context parameters substantially similar to the context parameters of the at least one of the at least two communicating entities. This enables the system to provide optimal configuration even at a beginning of the communication session, namely when the performance-specific observations for the communication session have not been recorded yet.

Optionally, in this regard, the method further comprises:
(f) storing the information indicative of the at least one action along with the context information;
(g) collecting new context information pertaining to at least one given communicating entity at a beginning of a new communication session; and
(h) utilizing the stored information to identify at least one initial action to be taken corresponding to the new context information at the beginning of the new communication session.

Optionally, the steps (f) to (h) are performed locally at the at least one given communicating entity. This enables the system to provide a retroactive insight after the communication session to remember at the at least one given communicating entity, namely on the client side. In this way, the stored information can be used for future reference, namely to decide an initial configuration that can be used at the beginning of the new communication session.

Additionally or alternatively, optionally, the steps (a) to (h) are performed at the server arrangement, wherein the server arrangement is coupled in communication with the at least one given communicating entity via the data communication network. It will be appreciated that it is advantageous to have at least a copy of the stored information in the server side to cope with, for example, the user losing his device, thereby losing the stored information.

Optionally, in this regard, the system further comprises a database arrangement associated with the server arrangement, wherein the server arrangement is configured to store, at the database arrangement, the information indicative of the at least one action along with the context information for future reference.

In one implementation, the server arrangement and the database arrangement are implemented by way of cloud computing services.

Moreover, optionally, the method comprises defining and learning when to update the configuration, namely how frequently to update the configuration. In this way, the system provides a generic framework for adapting to unpredictable and dynamically-changing data communication network environments.

Optionally, the configuration is determined macroscopically. In such a case, the configuration is required to be updated only once or a few times during the communication session. Optionally, in such a case, the configuration is updated on an event-driven basis. As an example, the configuration could be updated when the determined quality drops below a predefined threshold value. As another example, if another user involved in the same communication session cannot hear the user, the configuration could be updated to increase the gain automatically.

Alternatively, optionally, the configuration is determined microscopically. In such a case, the configuration is required to be updated several times during the communication session. As an example, the configuration could be updated every 5 seconds, 10 seconds, 15 seconds, 20 seconds, 30 seconds, 1 minute, 2 minutes, and so on.

Optionally, the configuration is sent to the at least one of the at least two communicating entities, via a data channel that is used for the digital communication. Alternatively, optionally, the configuration is sent via a separate data channel that is used by the server arrangement for collecting the context information. Yet alternatively, optionally, the configuration is sent via a separate signalling channel.

Optionally, the configuration is sent as a part of software updates, for example, such as JavaScript® or other software code, that are provided by the server arrangement.

In order to determine a configuration that is suited to a current context of the communication session, the context information is optionally collected from time to time during the communication session. Optionally, in this regard, the steps (a) to (e) are performed repeatedly during the communication session. As the system is aware of the context information and the performance-specific observations, the system is able to provide appropriate advisory action to users or system administrators (namely, people) and/or force a change to a certain network element and/or a certain device. In other words, the system is capable of providing an updated configuration during the call, as the system learns more about the context of the communication session.

Moreover, for a given entity, its configuration is defined by a set of configuration parameters. Optionally, the set of configuration parameters comprises at least one of:
(i) media codec(s) to be used,
(ii) media codec parameters (for example, such as a frame rate, a frame size, a frame quality, a resolution, an encoding profile, and similar),
(iii) media transmission rate (for example, such as an initial bitrate, a maximum bitrate, a minimum bitrate, and similar),
(iv) a jitter buffer size,
(v) a playout delay, (vi) congestion control parameters (for example, such as increase and decrease multipliers, a congestion control algorithm, and similar),
(vii) a packetization and error protection scheme to be used,
(viii) an IP address choice (namely, IPv4 vs. IPv6),
(ix) a transport protocol choice (for example, such as User Datagram Protocol (UDP), Transmission Control Protocol (TCP), Quick UDP Internet Connections (QUIC), and similar).

As an example, a minimum bitrate could be 4 Kbps and a maximum bitrate could be 8000 Kbps. The frame rate could be measured in frames per second depending on a type of the device. Moreover, the frame size could be measured as a frame height versus a frame width. Furthermore, the frame quality could be indicated, for example, by way of a quantization factor or other codec-specific parameters.

Optionally, when an updated configuration is sent, a complete set of configuration parameters is sent. Alternatively, optionally, only delta values (namely, changes) are sent.

Context Information:

It will be appreciated that the context information is collected at the at least one of the at least two communicating entities without a need for user intervention. In other words, the context information is collected automatically at the at least one of the at least two communicating entities. However, in some implementations, an optional arrangement is made to allow the user to provide information about at least one of the context parameters, for example, by way of a user feedback during the communication session.

In some instances, the context information is collected for an individual communicating entity only. In other instances, the context information is collected for a group of communicating entities. Optionally, in such a case, the context information is collected from respective communicating entities or via at least one communicating entity of the group of communicating entities. Alternatively, optionally, the context information is collected from at least one representative entity that has been selected from within the group of communicating entities.

Optionally, the context information pertaining to the at least one of the at least two communicating entities further comprises at least one of:
(i) a unique identifier of a user associated with the at least one of the at least two communicating entities (hereinafter referred to as a "userID", for the sake of convenience only),
(ii) an identifier of a conference to which the communication session belongs (hereinafter referred to as the "conferenceID", for the sake of convenience only),
(iii) an identifier of the communication session (hereinafter referred to as the "sessionID", for the sake of convenience only).

In some implementations, all participants in the conference, namely all of the at least two communicating entities, are assigned the same conferenceID; in such a case, the conferenceID is unique. In other implementations, the conferenceID is not unique, and therefore, sessionIDs are used; in such a case, each participant in the conference has a different sessionID. Beneficially, for a given participant, the sessionID changes when the given participant leaves and re-joins the conference.

Moreover, optionally, the context parameters related to the device comprise at least one of:
(i) a unique identifier of the device (hereinafter referred to as an "endpointID", for the sake of convenience only),
(ii) a profile of the device (for example, such as an Operating System (OS) executing on the device, a browser executing on the device, a manufacturer of the device, a device type of the device and similar),
(iii) a natural language used by the user of the device (as identified from, for example, settings of the browser, settings of the device, and similar),
(iv) whether or not the device is moving (namely, whether or not the user is moving) whilst the device is being used for the communication session,
(v) a velocity and/or an acceleration of the device, if the device is moving,
(vi) means of transportation of the user whilst the device is being used for the communication session (for example, whether the user is walking, running, cycling, in a car, on a bus, in a train, and similar),
(vii) a location of the device with reference to a local or global positioning system (for example, such as a geographical latitude and longitude measured by a Global Positioning System (GPS) unit of the device),
(viii) a civic location of the user, namely whether the device is located in an indoor environment or an outdoor environment,
(ix) a context of the environment in which the user is present (for example, such as a density of people around, an ambient temperature, weather conditions, and so forth),
(x) an interface of the device employed for the communication session (for example, such as a touch screen of the device, a microphone of the device, a headset of the device, a speaker of the device, and so on),
(xi) a date and time when the communication session is established,
(xii) a day or a week when the communication session is established,
(xiii) whether or not the day is a holiday (for example, as determined from a calendar application executing on the device),
(xiv) usage of computational resources of the device (for example, such as Central Processing Unit (CPU) usage, memory usage, and so forth),
(xv) a computational load on the device (for example, such as CPU load, memory load, and so forth),
(xvi) remaining battery power of the device,
(xvii) power consumption of the device.

It will be appreciated that the endpointID is specific to the device being used for the communication session. In other words, the endpointID represents the device that participates in the communication session. As an example, if a given user has multiple devices, these devices will have different endpointIDs for the same userID.

Optionally, the context parameters related to the communication client comprise at least one of:
(i) a unique identifier of a software application used to deploy the communication client (hereinafter referred to as an "AppID", for the sake of convenience only; the AppID represents a unique service deployment, for example, such as Skype®, Google® Hangout, and similar),
(ii) a name of the software application,
(iii) a version of the software application,
(iv) a status of the software application (namely, whether the software application is in production or in testing),
(v) a service provider of the communication client,
(vi) a natural language used by the user (for example, as identified from settings of the software application),
(vii) whether or not the communication client has sufficient processing power available, (viii) whether or not the communication client has sufficient network bandwidth available, (ix) other software applications or processes active at a given point of time.

As an example, the computational load on the device may be checked to determine whether or not the communication client has sufficient processing power available. In this regard, the system may check the other software applications or processes executing on the device, and may then advise the user or the at least one of the at least two communication entities to close some of the other software applications or processes.

Optionally, the context parameters related to the at least one media stream comprise at least one of:

(i) an amount of light in a video (for example, an amount of background light in the video),
(ii) a volume level of an audio,
(iii) noise conditions in the audio (for example, measured as a Signal-to-Noise Ratio (SNR) of the audio),
(iv) whether or not there is a face in the video (for example, as determined by an image analysis of at least one image frame of the video),
(v) whether or not the audio is understandable (for example, as determined by an audio analysis of at least one audio frame of the audio),
(vi) a unique ID of a source of the at least one media stream, namely a media stream track of the at least one media stream (hereinafter referred to as a "sourceID", for the sake of convenience only),
(vii) a name of a codec employed for the at least one media stream (for example, such as libvpx, ffmpeg, and similar),
(viii) a type of input interface used for the audio,
(ix) a type of input interface used for the video,
(x) a type of input interface used for written text and/or drawings,
(xi) a type of sensor used for measuring instantaneous physical properties (for example, such as brightness, temperature, velocity, acceleration, position, direction, presence or composition of chemical substances, and the like).

The type of audio input interface could be, for example, an audio-mic (namely, mono, stereo, or multi-channel capture), an audio-in (for example, from an external device, such as a musical instrument), or a system sound (namely, produced by another software application or process). The type of video input interface could be, for example, a camera (namely, a front-camera, a back-camera, a multi-camera for three-dimensions (3D), and similar), a 360° video, screen-sharing, or a capture of virtual spaces in 3D. Moreover, the type of input interface used for the written text and/or the drawings could be, for example, a digital pen, a stylus, or a graphic pen. Furthermore, examples of sensors used for measuring such instantaneous physical properties include, but are not limited to, ambient light sensors, temperature sensors, accelerometers, GPS sensors, gyroscopes, and chemical sensors.

Optionally, the sourceID is implemented by way of a Synchronization Source identifier or a Canonical Name (SSRC identifier or CNAME, respectively, from RFC3550). In the Real-time Transport Protocol (RTP), SSRCs within a same communication session are unique, while CNAMEs are unique even across communication sessions. Moreover, RTP supports a dynamic binding from SSRC to CNAME. Optionally, SSRCs or CNAMEs are exchanged between the at least two communicating entities during the setup of the communication session. As an example, during the setup of the communication session, the Session Description Protocol (SDP) can be used by endpoints associated with the at least two communicating entities to describe the communication session for purposes of session announcement, session invitation and negotiating parameters such as a media type, a media format and so forth.

It will be appreciated that the at least one media stream is typically communicated in an encrypted form; therefore, the context parameters are beneficially determined at the at least one of the at least two communicating entities. However, in an alternative implementation, the at least one media stream is optionally analyzed at the at least one network entity or at the server arrangement, when encryption credentials are shared therewith. Optionally, in this regard, the at least one of the at least two communicating entities is configured to send audio/video snapshots of the digital communication to the server arrangement.

Optionally, the context parameters related to the access network comprise at least one of:

(i) an identifier (ID) of the access network (namely, of an immediate access network),
(ii) an IP address of the device,
(iii) a unique Autonomous System Number (ASN) identifying an AS who owns the IP address,
(iv) a name of an Internet Service Provider (ISP) providing access to the Internet,
(v) measured properties of the access network (for example, such as ping latency, available bandwidth, dropped packets and so on),
(vi) other users connected to the same access network,
(vii) a communication load on the access network (for example, measured by the number of the other users),
(viii) whether the access network is private or public,
(ix) a network topological point of attachment of the device (for example, as identified via the IP address of the device, a trace route path, and similar),
(x) the location of the device, for example, as determined based upon the IP address of the device (for example, geoIP),
(xi) a type of the access network (for example, such as fixed vs. mobile, wired vs. wireless, cellular vs. Wireless Local Area Network (WLAN), and so forth),
(xii) a network type of a wireless network being used (for example, such as a 3G telecommunications network, a 4G telecommunications network, and so forth),
(xiii) an SNR of the wireless network,
(xiv) a signal strength of the wireless network.

In a specific embodiment, the context information is indicative of the endpointID, the AppID, the sourceID, and the location of the device.

As mentioned earlier, the context information can be collected several times, for example, at the beginning of the communication session and during the communication. Optionally, the context information is collected at the beginning of the communication session, and is stored in a form of a session context object. Optionally, when new context information is collected during the communication session, the session context object is updated with the new context information. As an example, the location and the access network can change if the user is moving. In such an instance, the properties of the access network (for example, such as ping latency, available bandwidth and so on) may also change.

Optionally, the steps (a) to (e) of the aforementioned method are performed by a given server of the server arrangement. In this regard, the given server is considered to act as a recommendation entity.

Optionally, the recommendation entity is configured to receive the audio/video snapshots of the digital communication from the at least one of the at least two communicating entities, and to employ signal processing for analyzing the audio/video snapshots.

Moreover, in order for the recommendation entity to be able to perform the analysis at the steps (c) and (d), suitable processing instructions are coded into the recommendation entity. Optionally, the processing instructions are updated from time to time.

Optionally, the processing instructions are updated based upon an outcome of the analysis performed at the recommendation entity, namely performance-specific observations made after the at least one action has been taken at the at least one of the at least two communicating entities and/or the at least one network entity. Optionally, in this regard, the processing instructions are based upon Artificial Intelligence (AI) techniques, for example, such as machine learning and data mining techniques. Such AI techniques not only enable the recommendation entity to infer insights from many inputs, namely the context information and the information indicative of the plurality of performance-specific observations (hereinafter referred to as the "observation information", for the sake of convenience only), but also enable the recommendation entity to learn which inputs to use when. Examples of such machine learning and data mining techniques include, but are not limited to, Support Vector Machine (SVM) algorithms, k-Nearest Neighbours (kNN) algorithms, k-means clustering algorithms, multi-armed bandit algorithms, and decision tree algorithms.

Optionally, in this regard, the processing instructions are implemented by way of a model that is used to determine a configuration for a given communicating entity, based upon the current context of the given communicating entity. Such a model is capable of deriving an estimated performance of the given communicating entity corresponding to the determined configuration.

Optionally, the model is parameterized to fit other contexts. Alternatively, optionally, different models are generated and tried for different contexts. Optionally, in such a case, for a given context, the model is selected from amongst the different models that are available. Model generation is optionally carried out as an offline process in the background, whereas model selection and parameterization are optionally performed as online processes.

Optionally, the model is separated from the context, and a common model is derived only for communicating entities with intersecting contexts. Optionally, in this regard, the context is used to subdivide a space in which different models are created, and each subspace creates its own models. In such a case, a degree of intersection may vary from no overlap to partial overlaps to complete overlaps between the contexts. It will be appreciated that a definition of an acceptable intersection may change over time, and may depend, for example, on an amount of context information collected, a type of configuration that is to be determined, and so on.

Alternatively, optionally, the model and the context are combined into a single space, such that the context parameters appear just as other model features (namely, performance-specific observations) that are provided as an input to the model. Optionally, the recommendation entity is configured to learn which performance-specific observations are to be considered as the context and which performance-specific observations are to be considered as the model features.

In a nut-shell, optionally, the recommendation entity is configured to perform following operations:
(i) collect the context information and the observation information,
(ii) use a model to generate the configuration, and
(iii) update the model based upon an outcome of implementing the configuration. This has been illustrated in conjunction with FIG. 4. The recommendation entity could perform such operations on-demand, upon receiving new data based upon events, continuously, or on a periodic basis (for example, such as daily, hourly, and so on).

Moreover, when the aforementioned steps (f) to (h) are performed locally at the at least one given communicating entity, the at least one given communicating entity may not have a fitting model, as the locally-stored information could be insufficient. Optionally, in such a case, the at least one given communicating entity is configured to:
(i) select a model (for example, based upon closeness to the locally-stored context information or randomly);
(ii) use the model to determine a new configuration at the beginning of the new communication session, and observe how the new configuration works;
(iii) update the model or select a different model, if the model does not fit the new context information (namely, if the new configuration does not work as desired), based upon further insights or by random trial-and-error; and
(iv) remember the model, if the model fits the new context information.

Optionally, in this regard, the method comprises providing the at least one given communicating entity with a complete model for local use. More optionally, a lightweight version of the model is provided to the at least one given communicating entity. Optionally, the server arrangement in configured to provide the at least one given communicating entity with updated parameters for an existing model.

Optionally, in this regard, the at least one given communicating entity is configured to check whether or not the model works as desired, and provide a feedback about a fit of the model to the server arrangement.

In an alternative implementation, the context information may be kept locally at the at least one given communicating entity only, and a configuration provided by the recommendation entity may be refined at the at least one given communicating entity, based upon the locally-stored information. This potentially facilitates a balance between a configuration recommendation received from the recommendation entity and privacy.

For illustration purposes only, there will now be considered an example sequence of steps that will be performed from a beginning of a given communication session to its end. One such example sequence of steps has been illustrated in conjunction with FIG. 3.

Step 1: A communicating entity "CE" identifies that a new communication session is to be initiated, and retrieves an initial configuration from locally-stored information.

Step 2: A recommendation entity "RE" collects context information from the CE.

Step 3: The RE collects observation information from at least one monitoring entity "ME".

Step 4: The RE retrieves a configuration to be used at the CE from a context/configuration database, based upon the context information and the observation information.

Step 5: The CE receives the configuration from the RE.

Step 6: The CE uses the configuration and observes performance.

Step 7: The RE collects updated context information and observation information from the CE.

Step 8: The RE retrieves an updated configuration from the context/configuration database, based upon the context information and the observation information received at the step 7, and provides the updated configuration to the CE.

Step 9: The CE adjusts the updated configuration locally and uses the adjusted configuration. The CE reports about the locally-adjusted configuration to the RE.

Step 10: The RE stores the configuration together with the context information for future reference.

It will be appreciated that making a good guess for the initial configuration at the step 1 potentially reduces time required to set up the communication session. Optionally, the steps 7 to 10 are performed in an iterative loop, until a suitable configuration is identified for the CE.

Analysis of Performance-Specific Observations:

Optionally, the method comprises configuring the at least one monitoring entity to record the plurality of performance-specific observations thereat. The term "plurality of performance-specific observations" is hereinafter referred to as the "observations", for the sake of convenience only.

More optionally, the at least one monitoring entity is configured to record the observations as a function of time or as a function of a monotonically-increasing marker associated with the packets. An example of such a monotonically-increasing marker is a packet sequence number. Notably, in the RTP, packets are assigned packet sequence numbers in a strictly monotonically-increasing manner. Alternatively, optionally, the at least one monitoring entity is configured to record the observations in a multi-dimensional tuple-space, database, or other means to support access to, reasoning about, and correlation of observations, optionally, in conjunction with the context information.

When the at least one of the at least two communicating entities is configured to act as a monitoring entity, the observations are optionally recorded by the communication client itself. Alternatively, optionally, the observations are recorded by a separate software application executing on the device.

Optionally, the at least one of the at least two communicating entities is configured by way of at least one of:
(i) a software library that is integrated in the device associated with the at least one of the at least two communicating entities,
(ii) a software plugin or extension that is installed at the device to extend the functionality of an existing browser application,
(iii) a stand-alone software application that is installed at the device,
(iv) a firmware integration.

Optionally, the at least one network entity is configured by way of at least one of:
(i) a software library that is integrated in a network device associated with the at least one network entity,
(ii) a stand-alone software application that is installed at the network device,
(iii) a firmware integration.

Optionally, in the method, the recommendation entity receives the observation information from the at least one monitoring entity, via at least one reporting entity. Optionally, in this regard, the observation information is received via reports from different entities. Such reports could comprise complete or partial data of the observations, raw or processed data of the observations, or any combination thereof.

It will be appreciated that a frequency at which a given monitoring entity monitors and records observations can be constant or can change over time. Optionally, the frequency is configured by the recommendation entity. Alternatively, optionally, the frequency is varied automatically within upper and lower bounds defined by the recommendation entity. More optionally, the frequency is varied as a function of at least one of:
(i) a storage space available for storing the observations,
(ii) quality metrics observed for the communication session (for example, such as a bitrate, a loss rate, and so on),
(iii) an observed load of a reporting entity to which the given monitoring entity reports,
(iv) an observed network load of a path between the given monitoring entity and the reporting entity,
(v) a rule set provided by the reporting entity,
(vi) a rule set that is determined based upon information and/or instructions provided by the reporting entity.

It will also be appreciated that when the at least one network entity acts as a monitoring entity, the at least one network entity observes the packets of the at least one media stream "on the wire". In other words, a communicating entity involved in the communication session has full access to all bits of each packet, namely after decryption or prior to encryption, whereas a network entity may have only limited access to data contained in the packets, namely access to data contained in unencrypted parts (for example, packet headers) of these packets.

Moreover, it will be appreciated that at the at least one network entity, a given packet is optionally identified by a quintuple comprising an IP address of a source of the given packet, an IP address of a destination of the given packet, a source port number, a destination port number, and a transport protocol. For multimedia, the transport protocol is usually, but not necessarily, UDP. Optionally, apart from the quintuple, the given packet further comprises a flow label or other identifiers to signify quality of service demands, for example, a differentiated services code point. Additionally, optionally, the given packet is further distinguished by its payload type or a unique identifier of its source. Notably, at the at least one of the at least two communicating entities, the identification of the given packet is simple, as a software application responsible for sourcing and sinking packets is assumed to use defined functions.

Moreover, optionally, the method further comprises providing the at least one monitoring entity with one or more of the plurality of context parameters, wherein the one or more of the plurality of context parameters are used to uniquely identify the packets being communicated during the communication session. This enables the at least one monitoring entity to record the observations for the same communication session. Optionally, in this regard, the at least one of the at least two communicating entities is configured to send the context information to the recommendation entity when the communication session is setup.

Moreover, according to an embodiment, the plurality of observations comprise at least one of:
(i) at least one packet arrival characteristic observed for the at least one media stream and/or the packets,
(ii) at least one media rendering characteristic observed for the at least one of the at least two communicating entities during rendering of the at least one media stream,
(iii) at least one transport address characteristic observed for the at least one of the at least two communicating entities.

Optionally, the at least one packet arrival characteristic observed for the at least one media stream and/or the packets comprises at least one of:
(i) the number of packets that are lost or discarded during communication,
(ii) distribution of individual and/or burst losses or discards of packets as a function of time or as a function of another monotonically-increasing marker, (iii) a length of burst losses or discards,
(iv) packets arrived at a given communicating entity and their associated timestamps or markers,
(v) duplicate packets arrived at a given communicating entity and their associated timestamps or markers,
(vi) reordered packets.

It will be appreciated that observing the at least one packet arrival characteristic for non-media packets enables determining the session quality in an extreme case, wherein non-connectivity between the at least two communicating entities yields very poor quality of experience.

Optionally, the at least one media rendering characteristic observed for the at least one of the at least two communicating entities during the rendering of the at least one media stream comprises at least one of:
(i) stalls in rendering,
(ii) buffer overruns or underruns,
(iii) a time-bound quality metric (for example, such as a playout delay and variation thereof),
(iv) a percentage of frames generated or rendered in time,
(v) an Audio/Video (A/V) sync or a sync between other types of media,
(vi) a media quality metric (for example, such as Peak-Signal-to-Noise-Ratio (PSNR) and Structural Similarity (SSIM) for video; the E model for audio; Mean-Opinion Score (MOS) and a selected media encoding and its parameters for any type of media),
(vii) a variation or skewness in other quality metrics (for example, such as a frame rate, a frame size, a packetization interval, and so forth).

Optionally, the at least one transport address characteristic observed for the at least one of the at least two communicating entities comprises at least one of:
(i) network interfaces available,
(ii) a given network interface in use,
(iii) a change in the given network interface,
(iv) handovers between different network interfaces,
(v) failed handovers,
(vi) disruptions in network connectivity,
(vii) connectivity losses,
(viii) Interactive Connectivity Establishment (ICE) candidates.

It is to be noted here that communicating entities may have multiple addresses, for example, including direct, indirect and translated addresses. Optionally, before commencing the communication session, the at least two communicating entities exchange probing packets to determine addresses on which they can reach each other.

Furthermore, optionally, the observation information is analyzed by performing at least one of: grouping the observations, filtering the observations, sampling at least a subset of the observations, rearranging the observations in a one-dimensional or multi-dimensional series, correlating the observations. Examples of the one-dimensional or multi-dimensional series include, but are not limited to, a timeline and a marker-line.

Optionally, the correlation is performed by using packet propagation delays, for example, occurring between two given monitoring entities. Optionally, in this regard, a One-Way Delay (OWD) between the two given monitoring entities is measured, and timestamps of observations recorded at either or both of the two given monitoring entities are adjusted according to the OWD.

Additionally or alternatively, optionally, the correlation is performed by using the markers (for example, such as packet sequence numbers or offsets in the RTP or other transport protocols) included in the packets. Optionally, the observations pertaining to the packets communicated in the at least one media stream are mapped onto a marker-line.

Additionally, optionally, the correlation is performed by using derived information related to the at least one media stream. As an example, loss bursts can be used to correlate observations pertaining to a same event. As another example, a correlation can be made between a sending rate of a first communicating entity and an observed receiver performance of a second communicating entity. This enables the system to infer and parameterize a model for the correlation.

Moreover, optionally, the observation information is analyzed in multiple stages on different sets of observations in series and/or in parallel. As an example, the analysis may be performed on an original set of observations recorded at a single monitoring entity, an aggregate of multiple sets of observations recorded at different monitoring entities, a subset of the observations, and so on. Optionally, the analysis is performed individually for each observation and/or jointly across observations of a similar type.

It will be appreciated that such analysis correlates different observations belonging to the same conference session. This yields performance statistics about individual communicating entities, groups of communicating entities, and the communication session as a whole.

Advisory and Forced Actions:

Optionally, the at least one action comprises at least one advisory action that is recommended to be taken by a user associated with the at least one of the at least two communicating entities (namely, the user of the device associated with the at least one of the at least two communicating entities). Optionally, in this regard, the user is notified about the at least one advisory action via the device.

Examples of such advisory actions include, but are not limited to, following:
(i) "increase microphone volume",
(ii) "light level low, increase camera sensitivity",
(iii) "not sufficient network bandwidth, move to a better spot",
(iv) "not sufficient network bandwidth, move 10 meters towards your left",
(v) "bad background noise, use mute when not talking",
(vi) "face not visible, turn on camera", and so on.

Pursuant to the present disclosure, such detailed advisory actions are provided based upon the context information and the observation information. Additionally, optionally, such advisory actions are provided based upon past trends identified for other communicating entities that were involved in other communication sessions and that had context parameters substantially similar to the context parameters of the at least one of the at least two communicating entities. As an example, the user may be notified as follows:

"Devices that made a video call under these circumstances had a good experience with the following configuration: . . . ."

For illustration purposes only, there will now be considered an example situation, where a given user has a tablet computer, his location is Starbucks® café, he seeks to participate in a multi-party teleconference, and his calendar (namely, a calendar application executing on his tablet computer) shows a one-hour slot reserved for the teleconference. These details form a part of context information that is sent to the system pursuant to the present disclosure. It will be appreciated that such context information is optionally sent to the system even before a communication session is established. The system analyzes the context information, and recommends the user's tablet computer (namely, a software application executing on the user's tablet computer), for example, to:

"use Starbuck's Wi-Fi, camera off, tell user to use headset, start with microphone mute, provide push-to-talk button on user interface"

Thus, the system allows for analyzing the context information to forecast possible communication issues prior to establishing the communication session, and provides a suitable configuration to be used at the user's device.

As yet another example, when the network bandwidth is not sufficient, the system could even advise the user to move to a new location, as the system is aware of the user's current location.

As still another example, if the user's audio is not loud enough, the user could be advised to adjust audio settings on his device. As yet another example, the system could advise the user to switch off the video to keep the conversation fluent.

Moreover, optionally, the at least one advisory action is provided using a push style, wherein the system notifies the user on its own. In such a case, the system could be proactive, and could try to assist before quality degrades noticeably. As a result, unnecessary (namely, avoidable) conversation between the at least two communicating entities (for example, a given user confirming whether the other user can hear him) is reduced.

Optionally, the server arrangement is configured to perform an analysis of the at least one media stream to find out when and how to interact with the user. Optionally, in this regard, the server arrangement is provided with encryption credentials, when the at least one media stream is communicated in the encrypted form.

Alternatively, optionally, the at least one advisory action is provided using a pull style, wherein the user queries the system whether or not the quality of digital communication in the communication session is acceptable. In such a case, the user is more in control of possible disruptions to the digital communication occurring due to interaction with the system. As the user queries the system, the system is optionally configured to learn from the queries what the user thinks about the quality of the digital communication.

Moreover, optionally, the method includes notifying, at least one other user associated with at least one other of the at least two communicating entities, about the at least one advisory action taken by the user. Optionally, the method includes notifying the at least one other user about a current status of the user.

As an example, when a user "X" mutes his microphone, other users in the same communication session are notified "user X has muted his microphone". As another example, when the user "X" gets disconnected, the other users are notified "user X disconnected"; when the user "X" rejoins, the other users are notified "user X rejoined".

Optionally, the user is notified about the at least one advisory action via a perceptive channel that is different from a channel being employed for the digital communication. Optionally, in this regard, the perceptive channel (namely, means for notifying the user) is selected, such that the perceptive channel does not disrupt the digital communication.

Optionally, the user is notified about the at least one advisory action via a dashboard. Alternatively, optionally, the user is notified about the at least one advisory action via a chat box, wherein a chat bot is employed to provide interactive text and images to the user.

Optionally, the perceptive channel is selected based upon properties of the device, namely the device associated with the at least one of the at least two communicating entities. As an example, if the device supports a vibration function, the device may be vibrated to notify the user about the at least one advisory action. As another example, the device may produce an alert sound to notify the user about the at least one advisory action. As yet another example, if the device supports multiple display windows, the device may display a message notifying about the at least one advisory action on a separate widget or a separate window. As still another example, one or more graphical and/or video symbols may be embedded on a display window. As yet another example, text snippets may be inserted into the display window. As still another example, an ambient coloring (for example, such as a color of a frame of the display window) may be changed from green to yellow to red.

It will be appreciated that the intrusiveness of the perceptive channel (for example, a visibility and an immediacy of the perceptive channel) may depend on a severity of the at least one advisory action, namely an urgency with which the at least one advisory action is required to be taken.

Optionally, the perceptive channel is selected by the communication client executing on the device. Alternatively, optionally, the perceptive channel is selected by a separate client executing on the device, wherein the separate client has been employed for collecting the context information and/or for collecting the observation information.

For illustration purposes only, there will now be considered an example situation where a user is involved in a video call (for example, such as a Skype® video call or similar) and the system identifies that a bandwidth employed for the video call is susceptibly low and that changing an access network employed would considerably improve the quality of the video call. In such an instance, the system may notify the user about the situation (namely, to ask the user to change the access network) using a separate chat box or a visual indicator (for example, such as red flashing borders around a video screen).

Moreover, optionally, the at least one action comprises at least one forced action to be performed by the at least one of the at least two communicating entities and/or the at least one network entity. It will be appreciated that such forced actions do not require any user intervention. However, the user is optionally notified once such forced actions have been performed successfully.

Optionally, at the at least one of the at least two communicating entities, the at least one forced action is performed by the communication client or the separate client executing on the aforementioned device. Examples of such forced actions include, but are not limited to, following:

(i) "increase microphone volume",
(ii) "light level low, increase camera sensitivity",
(iii) "change access network", and so on.

Optionally, at the at least one network entity, the at least one forced action is performed by a network client executing on a network device associated with the at least one network entity. An example of such a forced action is "change routing for user X in session S".

In this way, the method and system described herein utilize the context information and the observation information collected from the at least one of the at least two communicating entities, to address operational demands of the data communication network.

Furthermore, it will be appreciated that the context information and the observation information are provided to the server arrangement in a form of raw statistics. Optionally, when analyzing at the steps (c) and (d), the server arrangement is configured to inspect the raw statistics to create diagnostics, namely machine-level interpretations of the context information and the observation information. Such diagnostics are particularly beneficial to system administrators or network administrators of Internet Service Providers (ISP's).

Optionally, the server arrangement is configured to interpret the diagnostics to produce insights, namely human-understandable transformations of the diagnostics, and provide the insights to users as well as system administrators. It will be appreciated that the server arrangement is beneficially configured to choose whom to inform what. For instance, connectivity problems, latency, or packet loss may, for example, concern all users involved in the communication session; however, individual downstream problems may affect just one user.

Optionally, the diagnostics and the insights have three levels as follows:

(i) overall diagnostics and insights for a given communication session, (ii) overall diagnostics and insights for a pair (or a subgroup) of communicating entities participating in the given communication session, for example, if the pair (or the subgroup) is particularly affected, and (iii) overall diagnostics and insights for each communicating entity.

It will be appreciated that the insights are targeted to be intuitively understandable and actionable by human users, and optionally concern advisory actions recommended to be taken by the users. For the users, the insights may provide an instant feedback about whether their conference call is fine or has any issues coming up.

For illustration purposes only, there will now be considered examples of diagnosis and insights for a given communication session between multiple communicating entities.

Overall Diagnosis for Communication Session:

```
appid: "1038312202"
confid: "foobar",
userIDs: [Mike, Victor, Loius],
startTSinS:"1478244900",
endTSinS:"1478250300",
sessionID: "MTQ3ODI0NDkwMA==", //crypto random generated
status: [ongoing, terminated], //choose one
classification: [success, failed, partiallyFailed], //pick one.
diagnosis: {
    conference: { //diagnosis for the overall conference
        initialSetup: [success, failed, partially-failed], //pick one
        churn: true,
        totalRejoins: 14,
        maxRejoins: 10,
        transport: [tcp, udp, turn/tcp, turn/tls, turn/udp, host, stun],//pick
all that apply
        averageObjectiveQuality: 1.14,
        disruptions: true,
        disruptionReasons: [packetloss, connectivity, latency, battery,
signaling, ...], //choose as many that apply, multiple.
        maxSetupTime: 6s,
        ...
    },
    participants: [ // diagnosis for each userID
{"Mike":{...}},{"Victor":{...}},{"Louis":{...}},
    ]
}
```

Overall Diagnosis for Individual Communicating Entities:

```
appid: "1038312202"
confid: "foobar",
userIDs: [Mike, Victor, Loius],
...
diagnosis: {
    conference: { //diagnosis for the overall conference },
    participants: [ // diagnosis for each userID
        {"Mike":{
            initialSetup: [success, failed, partially-failed], //pick one
            totalRejoins: 10,
            totalSessionDuration: 88, //average=totalSessionDuration/totalRejoins
            minSesssionDuration: 2,
            maxSesssionDuration: 12,
            transport: [tcp, udp, turn/tcp, turn/tls, turn/udp, host, stun],//pick
all that apply
            averageObjectiveQuality: 1.53,
            totalDisruptions: 1,
            disruptionReasons: [packetloss, connectivity, latency, battery,
signaling, ...],
            totalDisruptionDuration:         3,
//average=totalDisruptionsDuration/totalDisruptions
            minDisruptionDuration: 3,
            maxDisruptionDuration: 3,
            maxSetupTime: 4s,
            }
        },
        {"Victor":{...}},
        {"Louis":{...}}
    ],
}
```

Overall Insights for Communication Session:
Conference was initiated successfully, that is, all connections were set up successfully.
Afterwards, some connections failed, due to loss in connectivity.
Some connections were disrupted, due to high latency.
Some connections were over TCP, which typically lowers media quality.
Some connections took a long time to set up again.
Some participants experienced churn, that is, they had to rejoin the conference. There were 14 rejoins in total. The participant with most rejoins rejoined 10 times.
Overall objective quality was acceptable: 1.14.

Overall Insights for Individual Communicating Entities:
Mike
Connection was over TCP, which typically lowers objective quality.
Connection took a long time to setup: 5549 ms.
Connection re-established 10 times. Average session length was 8 minutes. The shortest and longest sessions were 2 and 12 minutes.
Victor
Connection was disrupted due to high latency: 2 times. The average duration was 15 seconds, the shortest and longest disruption periods were 12 and 18 seconds.
Experienced network quality issues:
objective quality was 0.73.
Louis
Connection failed to re-establish, ICE connectivity failed (only host candidates).

Moreover, optionally, a mode of presentation of the diagnostics and/or the insights is selected based upon at least one of: the users' preferences, their role (for example, user versus system administrator), an observed context of an individual conference call, a relevance of a given conference call amongst a plurality of conference calls.

Optionally, the diagnostics and/or the insights are provided on a dashboard. Alternatively, optionally, the diagnostics and/or the insights are provided via an interactive chat bot, wherein a given user can query the chat bot for diagnostics related to a specific communication session or a specific participant. Yet alternatively, optionally, the diagnostics and/or the insights can be provided in a form of an interactive questionnaire.

Optionally, the system is configured to use the diagnostics and/or the insights to support user feedback. As an example, in order to collect the user's feedback on how he/she would rate the quality of the communication session, the system may be configured to use the diagnostics and/or the insights to pre-fill a feedback form, and to ask the user to confirm, whilst giving him/her an option to modify the feedback form. More optionally, the system is configured to select at least one severe issue identified by the system, and ask the user to confirm whether or not the user faced the same issue. This potentially reduces the number of interactions required with the user.

As an example, the user could be asked simple "YES/NO" questions to confirm the diagnosis made by the system. As another example, if several burst loss periods were observed during the communication session, the user could be asked "did you observe frequent audio clipping". As yet another example, if media was transmitted over TCP with varying Round-Trip Time (RTT), the user could be asked "did you observe infrequent outages".

It will be appreciated that the diagnostics and/or the insights can be presented to the users during and/or at an end of a given communication session.

Moreover, the diagnostics and/or the insights can be provided via push or pull techniques. Optionally, the diagnostics and/or the insights are presented automatically to the users as reports, for example, at the end of the given communication session. Optionally, the diagnostics and/or the insights are presented to the users, upon receiving their requests.

Continuing from the previous example, there will now be considered an example interaction with a chat bot.

How was the conference "meeting-01"?
  BOT: The conference was set up successfully, but some participants lost connectivity during the session.
  BOT: There were some quality issues with one participant.
  BOT: Click here to see more details.
Who were the participants?
  BOT: Mike, Victor, Louis
Who had low quality?
  BOT: Victor had low quality, due to connection outages, and periods of high latency.
What was the latency graph for Victor?
  BOT sends an image file (for example, such as a png file, a jpg file or similar) showing the latency graph.

Optionally, the server arrangement is configured to create an inspection vocabulary for implementing chat bots. Optionally, the inspection vocabulary includes terms and phrases used in questions that are asked frequently. As an example, the inspection vocabulary could include capitalized terms as well as phrases from the following:

WHO is having GOOD (or BAD) quality?
WHAT does xyz mean?
SHOW graph.

Optionally, such interactions with chat bots are summarized and compiled into brief reports automatically, for example, based upon frequently-asked questions. Optionally, the users are provided an option to select interactions they want to delete from the reports. Optionally, the users are provided an option to further interact with the chat bots.

It will be appreciated that the interaction with the chat bots is not limited to typed text, and can also include other forms of interaction, for example, such as graphical visualization (namely, with pointing and clicking, dragging and dropping, and similar), spoken text, other audible or visual input/output, gestures, and tactile input/output.

Moreover, according to an embodiment, the method further comprises sending, to at least one other of the at least two communicating entities, information indicative of at least one other action to be taken at the at least one other of the at least two communicating entities to improve the quality of digital communication, wherein the information indicative of the at least one other action is sent during the communication session. Optionally, the at least one other action is an advisory action to be taken by a user associated with the at least one other of the at least two communicating entities. Alternatively, optionally, the at least one other action is a forced action to be taken by the at least one other of the at least two communicating entities, without a need for any user intervention.

Optionally, the information indicative of the at least one other action is sent to the at least one other of the at least two communicating entities via the at least one of the at least two communicating entities.

For illustration purposes only, there will now be considered an example, wherein a first communicating entity and a second communicating entity are communicating with each other in a given communication session. In a first example situation, the first communicating entity is coupled in communication with a recommendation entity, and is using a recommendation service provided by the recommendation entity to retrieve a configuration based upon its configuration information. Optionally, in such a case, the second communicating entity communicates its context information to the first communicating entity, which then sends the context information to the recommendation entity. The recommendation entity then sends a separate configuration for the second communicating entity, via the first communicating entity.

In a second example situation, the first and second communicating entities are using a same recommendation service or different recommendation services. Optionally, in such a case, the first and second communicating entities operate independently. Alternatively, optionally, the first and second communicating entities operate in a concerted fashion. In such a case, following considerations may apply.

Optionally, when the first and second communicating entities are using the same recommendation service, the recommendation entity notices that it provides the recommendation service to both the first and second communicating entities, and therefore, performs necessary coordination in the background.

Optionally, the first and second communicating entities indicate to each other that they are using a recommendation service, for example, via signalling or a separate data channel. Optionally, in such a case, the first and second communicating entities then determine whether they are using a same recommendation service or different recommendation services, and inform their respective recommendation services. In such a case, the recommendation service(s) may decide to configure:

(i) only one of the first and second communicating entities, or
(ii) both of the first and second communicating entities.

When the first and second communicating entities use different recommendation services, the recommendation services may decide that one of the recommendation services takes up the configuration task for both of the first and second communicating entities. In such a case, the one of the recommendation services may send the configuration for other communicating entity via the other recommendation service or via its associated communicating entity.

Figure 5:
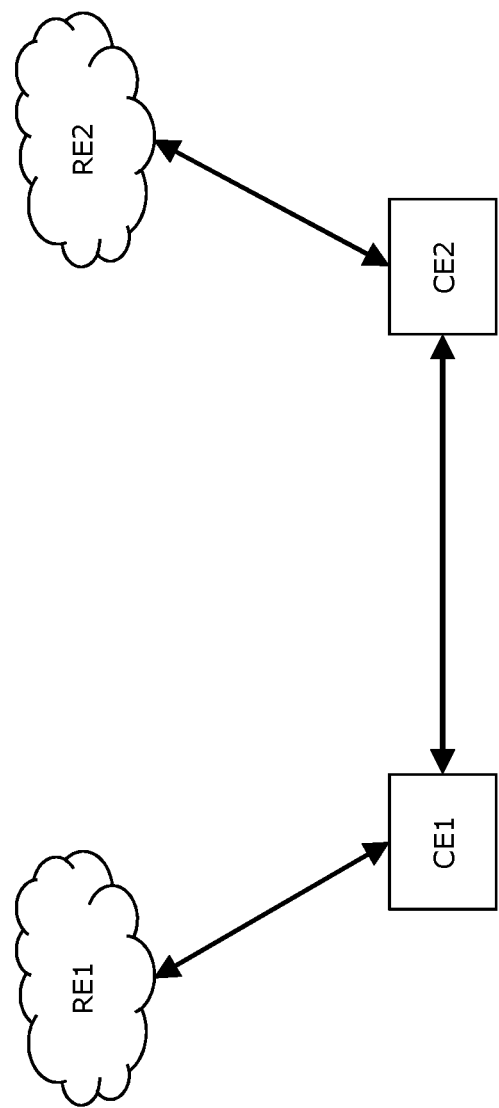
FIG. 5 is a schematic illustration of an example situation, wherein communicating entities "CE1" and "CE2" participating in a given communication session are using different recommendation services "RE1" and "RE2", respectively, in accordance with an embodiment of the present disclosure.

One such example situation has been illustrated in conjunction with FIG. 5.

However, it may not always be feasible to perform the configuration in a concerted fashion, for example, when two communicating entities use different recommendation services, which may have different optimization rules for recommending a suitable configuration.

It will be appreciated that the aforementioned example situations have been illustrated for two communicating entities, for the sake of simplicity only. A person of ordinary technical skill in the art will appreciate that these example situations can be easily extended to cover more than two communicating entities, for example, participating in a multi-party conference.

The present disclosure also relates to the aforementioned system, wherein the server arrangement is configured to perform various steps of the aforementioned method, as described earlier. Various embodiments and variants disclosed above apply mutatis mutandis to the system.

In a third aspect, embodiments of the present disclosure provide a computer program product comprising a non-transitory machine-readable data storage medium having stored thereon program instructions that, when accessed by a processing device, cause the processing device to:
(a) collect context information pertaining to a communicating entity associated with the processing device during a communication session, wherein the context information is indicative of a plurality of context parameters related to at least one of:
 (i) the processing device,
 (ii) a communication client being employed for the communication session by the communicating entity,
 (iii) at least one media stream being communicated between the communicating entity and at least one other communicating entity during the communication session,
 (iv) an access network being employed for the communication session by the communicating entity;
(b) record a plurality of performance-specific observations pertaining to at least one of: the at least one media stream, packets of the at least one media stream, the processing device;
(c) analyze the plurality of performance-specific observations to determine quality of digital communication in the communication session;
(d) analyze the context information, whilst taking into account the determined quality, to identify at least one action to be taken to improve the quality of digital communication, wherein the at least one action is to be taken during the communication session.

The third aspect concerns a software application (for example, a mobile "App") that can be installed on a processing device (namely, an endpoint, for example, such as a smartphone or similar) to perform the steps (a) to (d) locally. In such a case, the communicating entity acts as the monitoring entity.

Optionally, when accessed by the processing device, the program instructions cause the processing device to:
(e) store the information indicative of the at least one action along with the context information locally;
(f) collect new context information pertaining to the communicating entity at a beginning of a new communication session; and
(g) utilize the locally-stored information to identify at least one initial action to be taken corresponding to the new context information at the beginning of the new communication session.

DETAILED DESCRIPTION OF THE DRAWINGS

Referring now to the drawings, particularly by their reference numbers, FIG. 1 is a schematic illustration of a network environment, wherein a system for improving quality of digital communication in a communication session between communicating entities is implemented pursuant to embodiments of the present disclosure.

The network environment comprises:
at least two communicating entities, depicted as communicating entities 102a, 102b, 102c, 102d and 102e (hereinafter collectively referred to as the communicating entities 102),
a data communication network 104,
a conference server 106, and
a recommendation entity 108.

With reference to FIG. 1, the communicating entities 102 are coupled in communication with each other via the data communication network 104. The communicating entities 102 communicate with each other, via a conference service provided by the conference server 106.

Each of the communicating entities 102 sends its context information to the recommendation entity 108. At least one of the communicating entities 102 acts as a monitoring entity, and therefore, sends observation information to the recommendation entity 108 either directly or via at least one reporting entity.

The recommendation entity 108 analyzes the context information and the observation information to determine actions to be taken at the communicating entities 102, and sends information about these actions to the communicating entities 102.

FIG. 1 is merely an example, which should not unduly limit the scope of the claims herein. It is to be understood that the specific designation for the network environment is provided as an example and is not to be construed as limiting the network environment to specific numbers, types, or arrangements of communicating entities, data communication networks, conference servers, and recommendation entities. A person skilled in the art will recognize many variations, alternatives, and modifications of embodiments of the present disclosure.

Figure 2:
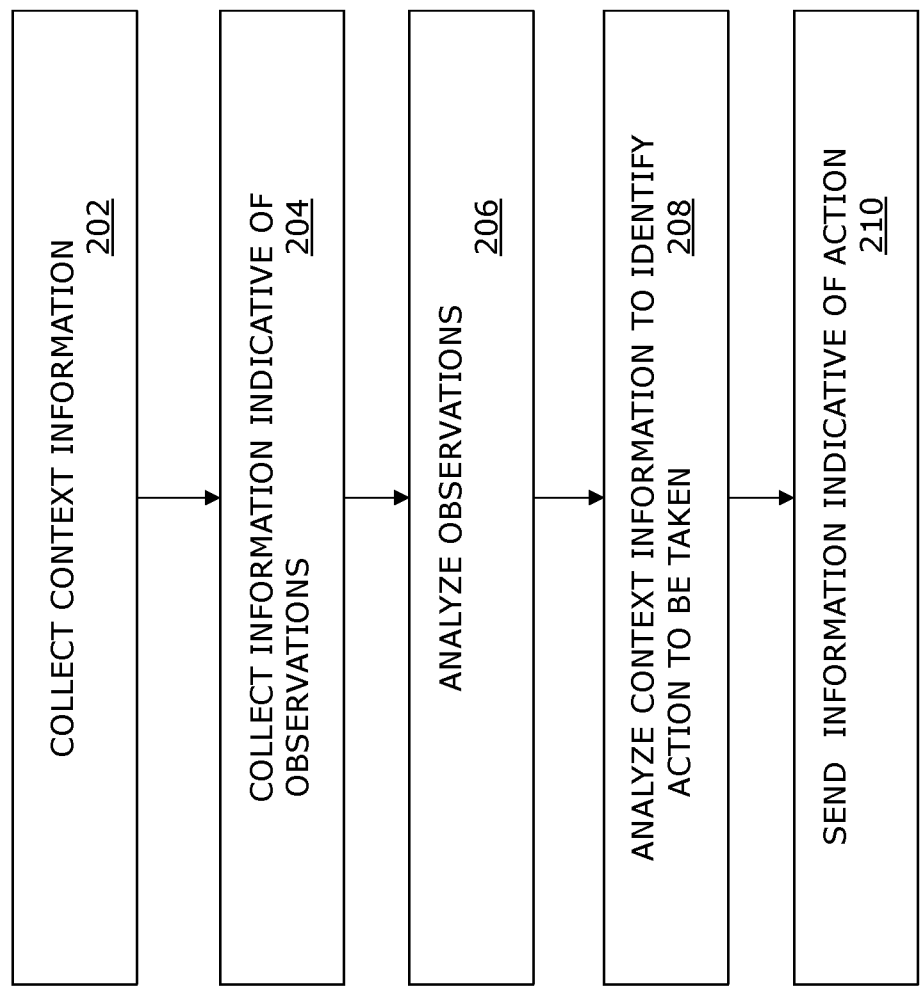
FIG. 2 is an illustration of steps of a method for improving quality of digital communication in a communication session between communicating entities, in accordance with an embodiment of the present disclosure.

FIG. 2 is an illustration of steps of a method for improving quality of digital communication in a communication session between at least two communicating entities, in accordance with an embodiment of the present disclosure. The method is depicted as a collection of steps in a logical flow diagram, which represents a sequence of steps that can be implemented in hardware, software, firmware or a combination thereof.

The method is implemented by way of a server arrangement comprising at least one server that is operable to act as a recommendation entity.

At a step 202, the recommendation entity collects, from at least one of the at least two communicating entities, context information pertaining to the at least one of the at least two communicating entities.

At a step 204, the recommendation entity collects, from at least one monitoring entity, information indicative of a plurality of performance-specific observations recorded thereat. The at least one monitoring entity comprises at least one of: the at least one of the at least two communicating entities, at least one network entity forwarding at least one media stream between the at least two communicating entities.

At a step 206, the recommendation entity analyzes the plurality of performance-specific observations to determine the quality of digital communication in the communication session.

At a step 208, the recommendation entity analyzes the context information, whilst taking into account the determined quality, to identify at least one action to be taken to improve the quality of digital communication.

At a step 210, the recommendation entity sends, to the at least one of the at least two communicating entities and/or the at least one network entity, information indicative of the at least one action to be taken. The information indicative of the at least one action is sent during the communication session.

The steps 202 to 210 are only illustrative and other alternatives can also be provided where one or more steps are added, one or more steps are removed, or one or more steps are provided in a different sequence without departing from the scope of the claims herein.

Figure 3:
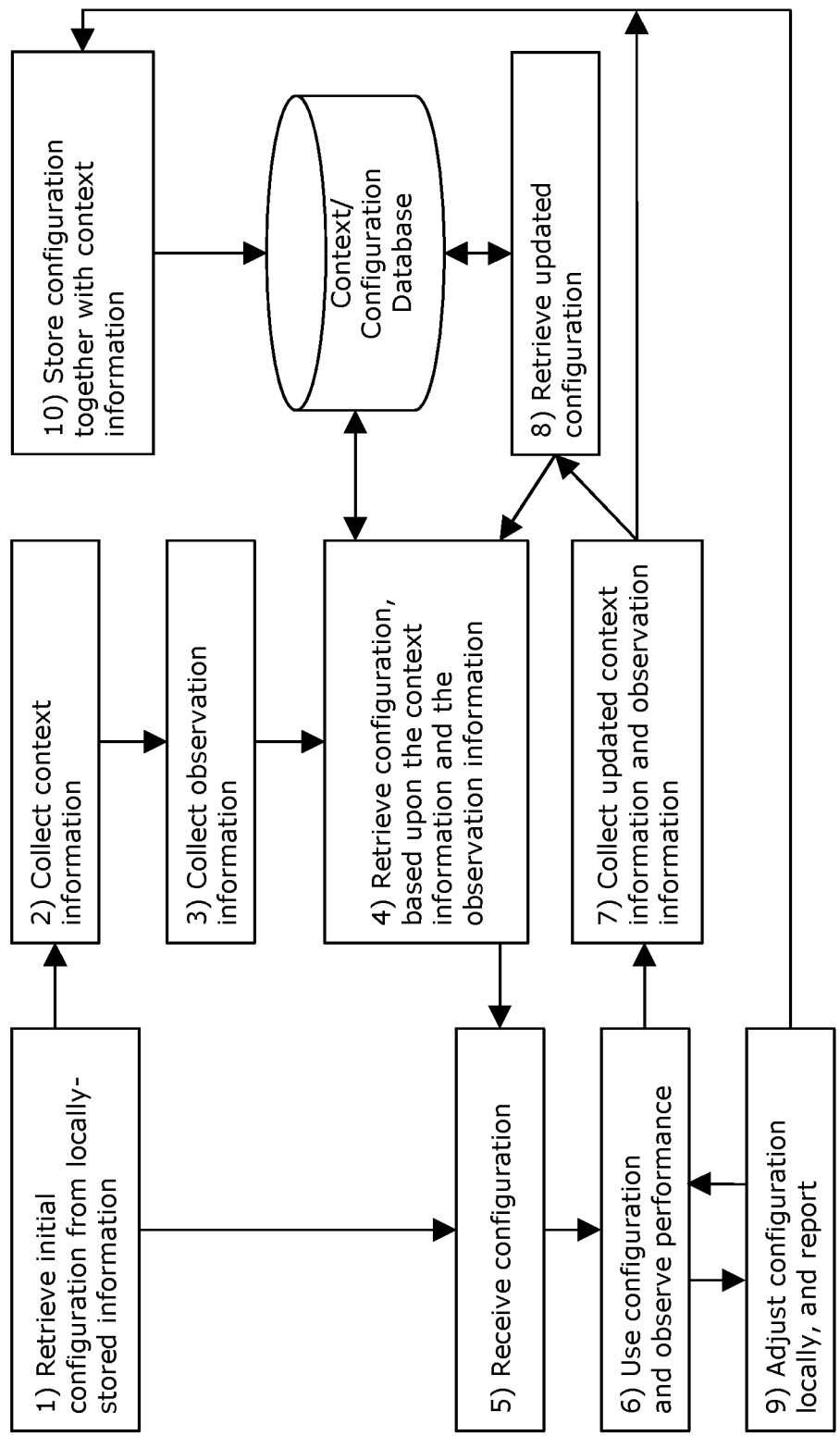
FIG. 3 is a schematic illustration of an example sequence of steps that are performed from a beginning of a given communication session to its end, in accordance with an embodiment of the present disclosure.

FIG. 3 is a schematic illustration of an example sequence of steps that are performed from a beginning of a given communication session to its end, in accordance with an embodiment of the present disclosure. The steps 1 to 10 have been elucidated in detail earlier, wherein the steps 1, 5, 6 and 9 are performed at a communicating entity, while the steps 2, 3, 4, 7, 8 and 10 are performed at a recommendation entity.

It will be appreciated that the steps 7 to 10 are performed in an iterative loop, until a suitable configuration is identified for the communicating entity.

FIG. 3 is merely an example, which should not unduly limit the scope of the claims herein. A person skilled in the art will recognize many variations, alternatives, and modifications of embodiments of the present disclosure.

Figure 4:
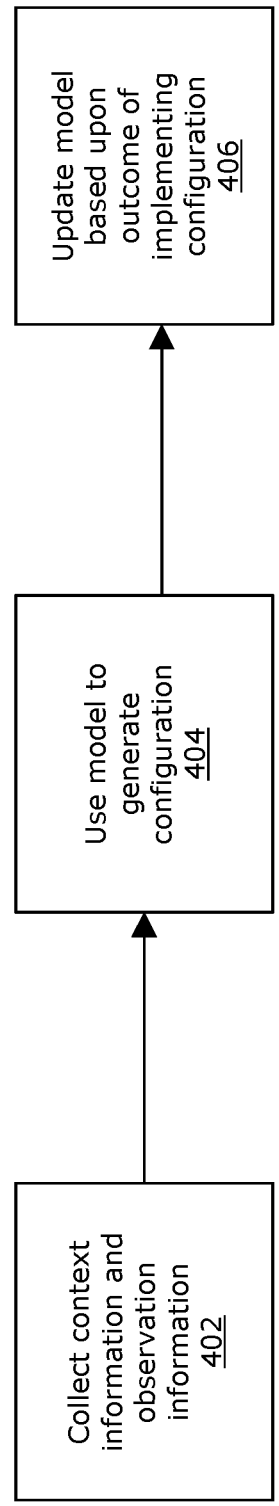
FIG. 4 is a schematic illustration of operations that are performed at a recommendation entity for creating a model, in accordance with an embodiment of the present disclosure.

FIG. 4 is a schematic illustration of operations that are performed at a recommendation entity for creating a model, in accordance with an embodiment of the present disclosure. Operations 402, 404 and 406 have been elucidated in detail earlier.

FIG. 4 is merely an example, which should not unduly limit the scope of the claims herein. A person skilled in the art will recognize many variations, alternatives, and modifications of embodiments of the present disclosure.

FIG. 5 is a schematic illustration of an example situation, wherein communicating entities "CE1" and "CE2" participating in a given communication session are using different recommendation services "RE1" and "RE2", respectively, in accordance with an embodiment of the present disclosure.

Optionally, CE1 and CE2 operate independently. Alternatively, optionally, CE1 and CE2 operate in a concerted fashion, for example, as described earlier.

FIG. 5 is merely an example, which should not unduly limit the scope of the claims herein. A person skilled in the art will recognize many variations, alternatives, and modifications of embodiments of the present disclosure.

Figure 6:
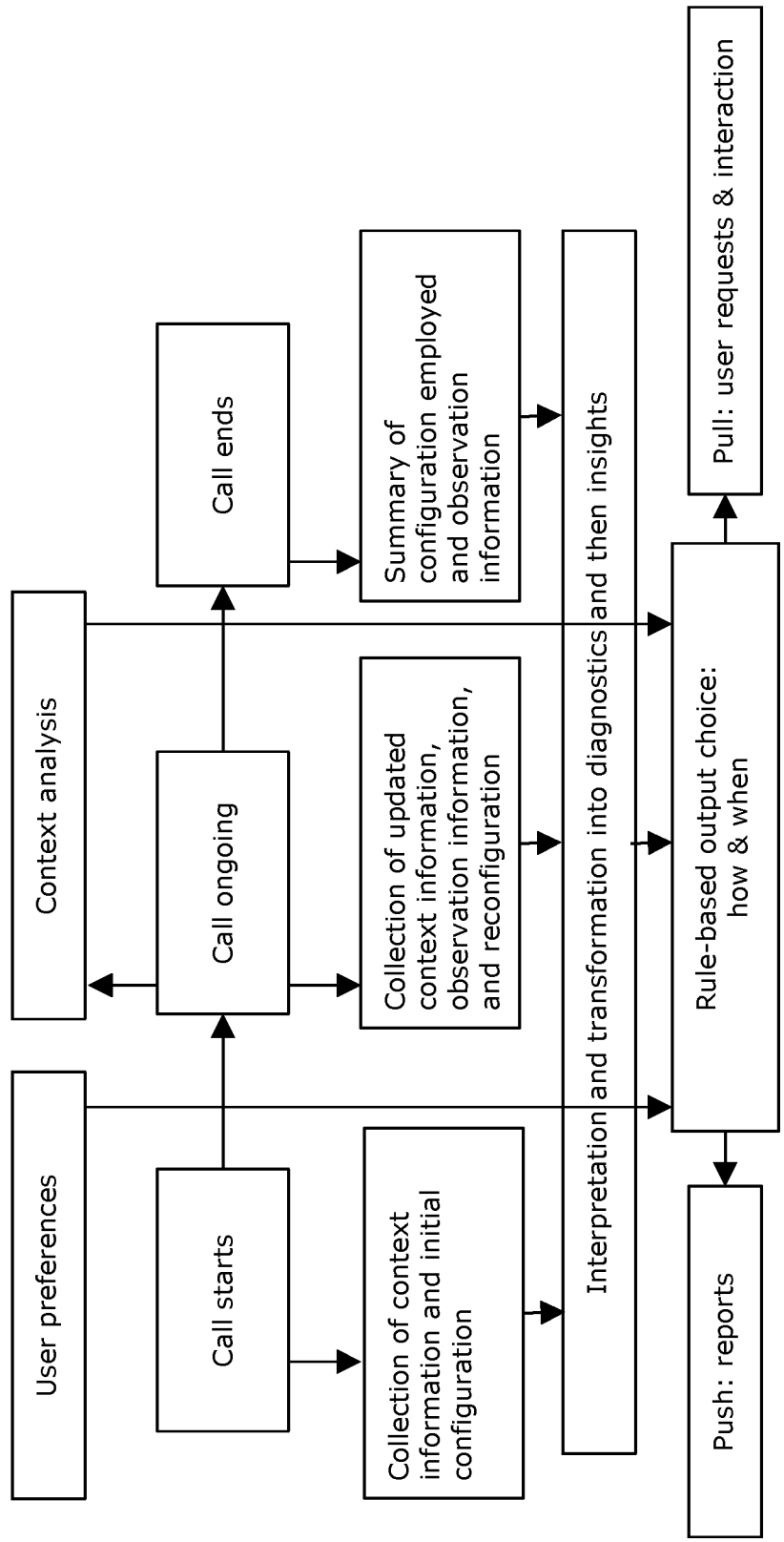
FIG. 6 is a schematic illustration of an example process flow from a start of a conference call to its end, in accordance with an embodiment of the present disclosure.

FIG. 6 is a schematic illustration of an example process flow from a start of a conference call to its end, in accordance with an embodiment of the present disclosure.

At the start of the call, context information pertaining to at least one communicating entity participating in the call is collected. An initial configuration is determined, based on the context information, for use at the at least one communicating entity.

During the call, the context information is updated, and collected together with observation information. The context information and the observation information are analyzed to determine an updated configuration to be used for the at least one communicating entity.

At the end, a summary of the configuration used and corresponding observation information is collected.

It will be appreciated that all the information collected at the different stages in the call (namely, at the start, during and at the end of the call) is in the form of raw statistics. The raw statistics is inspected to create diagnostics, which is then interpreted to produce insights, as described earlier.

A mode of presentation of the diagnostics and/or the insights is selected based upon various factors, for example, such as user preferences, their role, and an observed context of the conference call, as described earlier.

Moreover, the diagnostics and/or the insights can be provided via push or pull techniques, as described earlier.

FIG. 7 is a schematic illustration of how the raw statistics, the diagnostics and the insights are provisioned to users and system administrators, in accordance with an embodiment of the present disclosure.

FIGS. 6 and 7 are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system, comprising:

A method of improving quality of digital communication in a communication session between at least two communicating entities, the method comprising:

retrieving, by at least one of the at least two communication entities, an initial configuration from locally-stored information;

(a) collecting, from the at least one of the at least two communicating entities, context information pertaining to the at least one of the at least two communicating entities, wherein the context information is indicative of a plurality of context parameters related to at least one of:

(i) a device associated with the at least one of the at least two communicating entities, (ii) a communication client being employed for the communication session by the at least one of the at least two communicating entities, (iii) at least one media stream being communicated between the at least two communicating entities during the communication session, (iv) an access network being employed for the communication session by the at least one of the at least two communicating entities;

(b) collecting, from at least one monitoring entity, information indicative of a plurality of performance-specific observations recorded at the at least one monitoring entity, wherein the plurality of performance-specific observations pertain to at least one of: the at least one media stream, packets of the at least one media stream, the device associated with the at least one of the at least two communicating entities, wherein the at least one monitoring entity comprises at least one of: the at least one of the at least two communicating entities, at least one network entity forwarding the at least one media stream between the at least two communicating entities;

(c) analyzing the plurality of performance-specific observations to determine the quality of digital communication in the communication session;

(d) analyzing the context information, while taking into account the determined quality, to identify at least one action to be taken to irprowe the quality of digital communication;

(e) sending, to the at least one of the at least two communicating entities and/or the at least one network entity, information indicative of the at least one action to be taken, wherein the information indicative of the at least one action is sent during the communication session; and updating, by the at least one of the at least two communicating entities, the initial configuration to a current configuration based on the received information indicative of the at least one action to be taken; and wherein the steps (a) to (e) are performed at a server.

2. The method according to claim 1, wherein the at least one action comprises at least one advisory action that is recommended to be taken by a user associated with the at least one of the at least two communicating entities.

3. The method according to claim 2, wherein the user is notified about the at least one advisory action via a perceptive channel that is different from a channel being employed for the digital communication.

4. The method according to claim 1, wherein the at least one action comprises at least one forced action to be performed by the at least one of the at least two communicating entities and/or the at least one network entity.

5. The method according to claim 1, further comprising sending, to at least one other of the at least two communicating entities, information indicative of at least one other action to be taken at the at least one other of the at least two communicating entities to improve the quality of digital communication, wherein the information indicative of the at least one other action is sent during the communication session.

6. The method according to claim 5, wherein the information indicative of the at least one other action is sent to the at least one other of the at least two communicating entities via the at least one of the at least two communicating entities.

7. The method according to claim 1, wherein the steps (a) to (e) are performed repeatedly during the communication session.

8. The method according to claim 1, further comprising:

(f) storing the information indicative of the at least one action along with the context information;

(g) collecting new context information pertaining to at least one given communicating entity at a beginning of a new communication session; and (h) utilizing the stored information to identify at least one initial action to be taken corresponding to the new context information at the beginning of the new communication session.

9. The method according to claim 8, wherein the steps (f) to (h) are performed locally at the at least one given communicating entity.

10. The method according to claim 8, wherein the steps (a) to (h) are performed at a server arrangement that is coupled in communication with the at least one given communicating entity.

11. A system for improving quality of digital communication in a communication session between at least two communicating entities, the system comprising a server arrangement that is configured to:

retrieve, by at least one of the at least two communication entities, an initial configuration from locally-stored information;

(a) collect, from the at least one of the at least two communicating entities, context information pertaining to the at least one of the at least two communicating entities, wherein the context information is indicative of a plurality of context parameters related to at least one of:

(i) a device associated with the at least one of the at least two communicating entities, (ii) a communication client being employed for the communication session by the at least one of the at least two communicating entities, (iii) at least one media stream being communicated between the at least two communicating entities during the communication session, and (iv) an access network being employed for the communication session by the at least one of the at least two communicating entities;

(b) collect, from at least one monitoring entity, information indicative of a plurality of performance-specific observations recorded at the at least one monitoring entity, wherein the plurality of performance-specific observations pertain to at least one of: the at least one media stream, packets of the at least one media stream, the device associated with the at least one of the at least two communicating entities, wherein the at least one monitoring entity comprises at least one of: the at least one of the at least two communicating entities, at least one network entity forwarding the at least one media stream between the at least two communicating entities;

(c) analyze the plurality of performance-specific observations to determine the quality of digital communication in the communication session;

(d) analyze the context information, whilst taking into account the determined quality, to identify at least one action to be taken to improve the quality of digital communication; and (e) send, to the at least one of the at least two communicating entities and/or the at least one network entity, information indicative of the at least one action to be taken, wherein the information indicative of the at least one action is to be sent during the communication session; and update, by the at least one of the at least two communicating entities, the initial configuration to a current configuration based on the received information indicative of the at least one action to be taken; and wherein the steps (a) to (e) are performed at a server.

12. The system according to claim 11, wherein the at least one action comprises at least one advisory action that is recommended to be taken by a user associated with the at least one of the at least two communicating entities.

13. The system according to claim 11, wherein the at least one action comprises at least one forced action to be performed by the at least one of the at least two communicating entities and/or the at least one network entity.

14. The system according to claim 11, wherein the server arrangement is configured to send, to at least one other of the at least two communicating entities, information indicative of at least one other action to be taken at the at least one other of the at least two communicating entities to improve the quality of digital communication, wherein the information indicative of the at least one other action is to be sent during the communication session.

15. The system according to claim 14, wherein the information indicative of the at least one other action is to be sent to the at least one other of the at least two communicating entities via the at least one of the at least two communicating entities.

16. The system according to claim 11, wherein the server arrangement is configured to perform the steps (a) to (e) repeatedly during the communication session.

17. The system according to claim 11, further comprising a database arrangement associated with the server arrangement, wherein the server arrangement is configured to:
 (f) store, at the database arrangement, the information indicative of the at least one action along with the context information;
 (g) collect, from at least one given communicating entity, new context information pertaining to the at least one given communicating entity at a beginning of a new communication session; and
 (h) utilize the information stored at the database arrangement to identify at least one initial action to be taken corresponding to the new context information at the beginning of the new communication session.

18. The system according to claim 11, wherein at least one given communicating entity is configured to:
 (i) store the information indicative of the at least one action along with the context information locally;
 (j) collect new context information pertaining to the at least one given communicating entity at a beginning of a new communication session; and
 (k) utilize the locally-stored information to identify at least one initial action to be taken corresponding to the new context information at the beginning of the new communication session.

19. A computer program product comprising a non-transitory machine-readable data storage medium having stored thereon program instructions that, when accessed by a processing device, cause the processing device to:
 retrieving, by at least one of the at least two communication entities, an initial configuration from locally-stored information;
 (a) collect context information pertaining to a communicating entity associated with the processing device during a communication session, wherein the context information is indicative of a plurality of context parameters related to at least one of:
  (i) the processing device,
  (ii) a communication client being employed for the communication session by the communicating entity,
  (iii) at least one media stream being communicated between the communicating entity and at least one other communicating entity during the communication session,
  (iv) an access network being employed for the communication session by the communicating entity;
 (b) record a plurality of performance-specific observations pertaining to at least one of: the at least one media stream, packets of the at least one media stream, the processing device;
 (c) analyze the plurality of performance-specific observations to determine quality of digital communication in the communication session;
 (d) analyze the context information, whilst taking into account the determined quality, to identify at least one action to be taken to improve the quality of digital communication, wherein the at least one action is to be taken during the communication session^.
 e) send, to the at least one of the at least two communicating entities and/or the at least one network entity, information indicate of the at least one action to be taken, wherein the information indicative of the at least one action is sent during the communication session; and
 update the initial configuration of the at least one of the at least two communicating entities to a currant configuration based on the received information indicative of the at least one action to be taken; and
 wherein the steps (a) to (e) are performed at a server.

20. The computer program product according to claim 19, further comprising:
 (f) storing the information indicative of the at least one action along with the context information;
 (g) collecting new context information pertaining to at least one given communicating entity at a beginning of a new communication session; and
 (h) utilizing the stored information to identify at least one initial action to be taken corresponding to the new context information at the beginning of the new communication session, wherein steps (f)-(h) are performed locally at one of the communicating entity or the at least one other communicating entity.

* * * * *